United States Patent
Miyaji

(10) Patent No.: US 10,664,211 B2
(45) Date of Patent: May 26, 2020

(54) IMAGE FORMING APPARATUS SCANS DOCUMENT INCLUDES IMAGES IN IMAGE AREAS AND USING KEYWORDS TO SEARCH IMAGES STORED IN MEMORY SIMILAR TO SCANNED IMAGES AND PLACES IN THE IMAGE AREAS OF SCANNED DOCUMENT

(71) Applicant: KYOCERA Document Solutions Inc., Osaka (JP)

(72) Inventor: Hikaru Miyaji, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/904,509

(22) Filed: Feb. 26, 2018

(65) Prior Publication Data
US 2018/0246689 A1    Aug. 30, 2018

(30) Foreign Application Priority Data
Feb. 27, 2017    (JP) .................. 2017-034858

(51) Int. Cl.
*G06F 3/12*    (2006.01)
*H04N 1/00*    (2006.01)
(Continued)

(52) U.S. Cl.
CPC .......... *G06F 3/1253* (2013.01); *G06F 3/1205* (2013.01); *G06F 3/1242* (2013.01);
(Continued)

(58) Field of Classification Search
None
See application file for complete search history.

(56) References Cited

U.S. PATENT DOCUMENTS

2006/0215909 A1*  9/2006  Itonori .................. G06F 17/217
                                                        382/176
2011/0167081 A1*  7/2011  Kosaka .............. G06K 9/00456
                                                        707/769
(Continued)

FOREIGN PATENT DOCUMENTS

JP    H06-314321 A    11/1994
JP    2003-216648 A    7/2003

OTHER PUBLICATIONS

An Office Action mailed by the Japanese Patent Office dated Jun. 25, 2019, which corresponds to Japanese Patent Application No. 2017-034858 and is related to U.S. Appl. No. 15/904,509.

*Primary Examiner* — Benny Q Tieu
*Assistant Examiner* — Haris Sabah
(74) *Attorney, Agent, or Firm* — Studebaker & Brackett PC

(57) ABSTRACT

An image forming apparatus for forming an image on a sheet includes a reading section, a determining section, a generation section, a searching section, and a placement section. The reading section reads a predetermined shape from an original document. The determining section determines whether or not the predetermined shape contains a first image. The generation section generates a first search condition based on the first image. The searching section searches for at least one second image fulfilling the first search condition from a storage apparatus storing a plurality of images. The placement section places the second image in a first area in which the predetermined shape is located.

6 Claims, 7 Drawing Sheets

(51) Int. Cl.

| | | |
|---|---|---|
| *H04N 1/23* | (2006.01) | |
| *H04N 1/387* | (2006.01) | |
| *H04N 1/405* | (2006.01) | |
| *G06K 9/00* | (2006.01) | |
| *G06K 9/32* | (2006.01) | |
| *G06K 15/02* | (2006.01) | |

(52) U.S. Cl.
CPC ....... *G06F 3/1284* (2013.01); *H04N 1/00355* (2013.01); *H04N 1/00358* (2013.01); *H04N 1/00374* (2013.01); *H04N 1/00413* (2013.01); *H04N 1/00424* (2013.01); *H04N 1/00453* (2013.01); *H04N 1/00461* (2013.01); *H04N 1/00801* (2013.01); *H04N 1/233* (2013.01); *H04N 1/387* (2013.01); *G06F 3/1257* (2013.01); *G06K 9/00469* (2013.01); *G06K 9/3241* (2013.01); *G06K 15/1848* (2013.01); *G06K 15/1885* (2013.01); *H04N 1/4057* (2013.01); *H04N 2201/0094* (2013.01)

(56) References Cited

U.S. PATENT DOCUMENTS

2014/0240786 A1\* 8/2014 Honda .................. H04N 1/387
358/1.18
2016/0009105 A1\* 1/2016 Yamada .................... B41J 3/46
347/6

\* cited by examiner

IMAGE FORMING APPARATUS SCANS DOCUMENT INCLUDES IMAGES IN IMAGE AREAS AND USING KEYWORDS TO SEARCH IMAGES STORED IN MEMORY SIMILAR TO SCANNED IMAGES AND PLACES IN THE IMAGE AREAS OF SCANNED DOCUMENT

INCORPORATION BY REFERENCE

The present application claims priority under 35 U.S.C. § 119 to Japanese Patent Application No. 2017-034858, filed on Feb. 27, 2017. The contents of this application are incorporated herein by reference in their entirety.

BACKGROUND

The present disclosure relates to an image forming apparatus.

In an image searching system, a server receives an image from a user through a network. The server searches for images that are similar to the received image, and sends search result images to the user. According to the image searching system, the user can create a document that includes the images received from the server by manually pasting the images into the document.

SUMMARY

According to an aspect of the present disclosure, an image forming apparatus for forming an image on a sheet includes a reading section, a determining section, a generation section, a searching section, and a placement section. The reading section reads a predetermined shape from an original document. The determining section determines whether or not the predetermined shape contains a first image. The generation section generates a first search condition based on the first image. The searching section searches for at least one second image fulfilling the first search condition from a storage apparatus. The storage apparatus stores a plurality of images. The placement section places the second image in a first area in which the predetermined shape is located.

DETAILED DESCRIPTION

Figure 1:
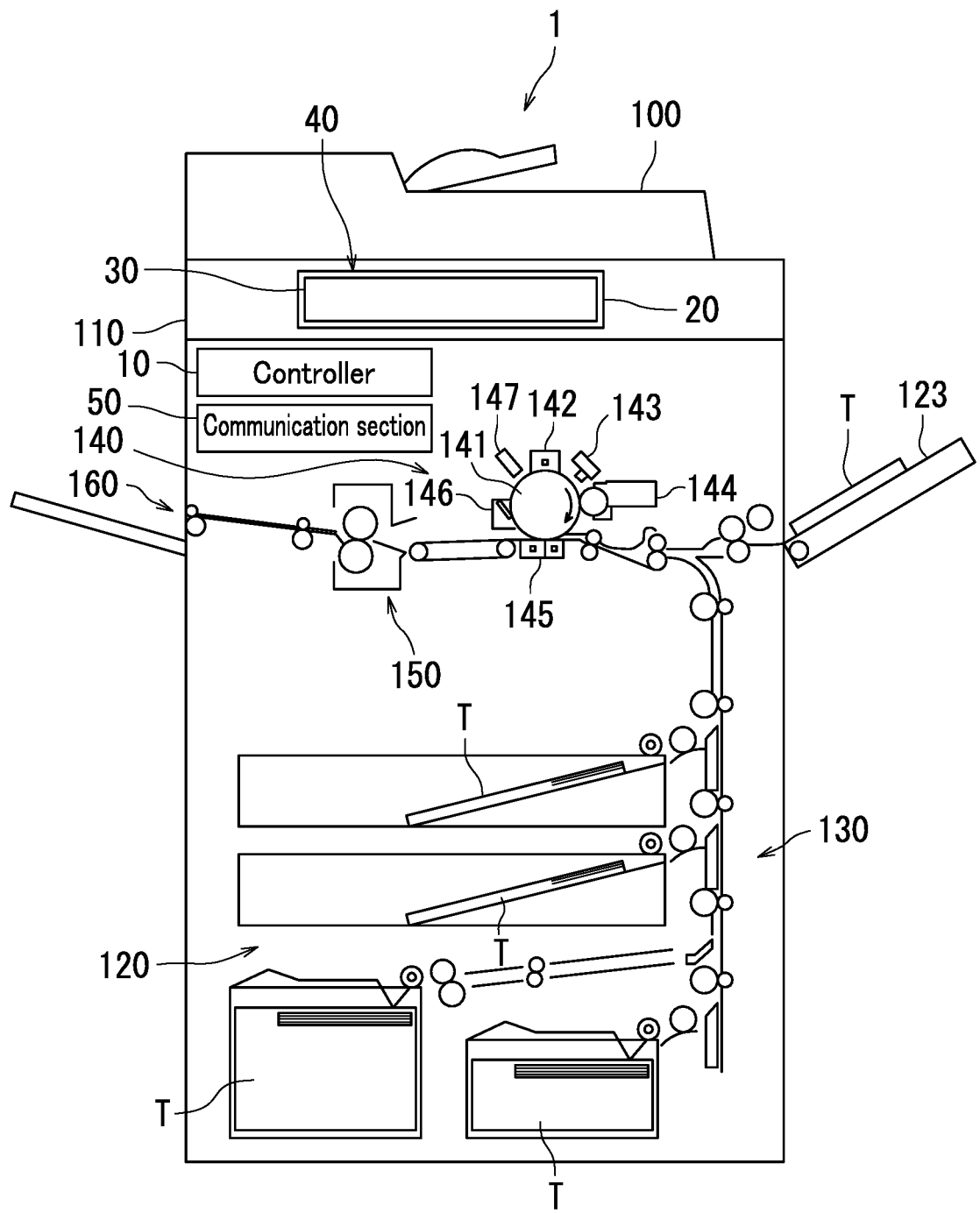
FIG. 1 is a diagram illustrating an image forming apparatus according to an embodiment of the present disclosure.

An embodiment of the present disclosure will be described as follows with reference to FIGS. 1 to 9. It should be noted that elements in the drawings that are the same or equivalent are labelled using the same reference signs and description thereof will not be repeated.

First Embodiment

A first embodiment of the present disclosure will be described as follows reference to FIGS. 1 to 5.

FIG. 1 illustrates an image forming apparatus 1 according to the first embodiment of the present disclosure. The image forming apparatus 1 forms an image on a sheet T. The image forming apparatus 1 is a multifunction peripheral for example, and includes a scan function, a copy function, a printing function, and a facsimile function.

As illustrated in FIG. 1, the image forming apparatus 1 includes a controller 10, an operation panel 40, a communication section 50, a document conveyance section 100, an image reading section 110, a housing section 120, a conveyance section 130, an image forming section 140, a fixing section 150, and an ejection section 160. The controller 10 controls the operation panel 40, the communication section 50, the document conveyance section 100, the image reading section 110, the housing section 120, the conveyance section 130, the image forming section 140, the fixing section 150, and the ejection section 160.

The operation panel 40 includes a display section 20 and a touch sensor 30. The touch sensor 30 is a touch panel for example, and is located over a display surface of the display section 20. The communication section 50 communicates with an external apparatus through a network.

The document conveyance section 100 conveys an original document to the image reading section 110. The image reading section 110 (reading section) reads an image from the original document. The housing section 120 houses the sheet T. The conveyance section 130 conveys the sheet T from the housing section 120 to the ejection section 160 through the image forming section 140 and the fixing section 150.

The image forming section 140 forms an image on the sheet T. The image forming section 140 also includes a photosensitive drum 141, a charger 142, an exposure section 143, a development section 144, a transfer section 145, a cleaning section 146, and a static eliminating section 147. The fixing section 150 fixes the image on the sheet T by applying heat and pressure to the sheet T. The ejection section 160 ejects the sheet T.

Figure 2:
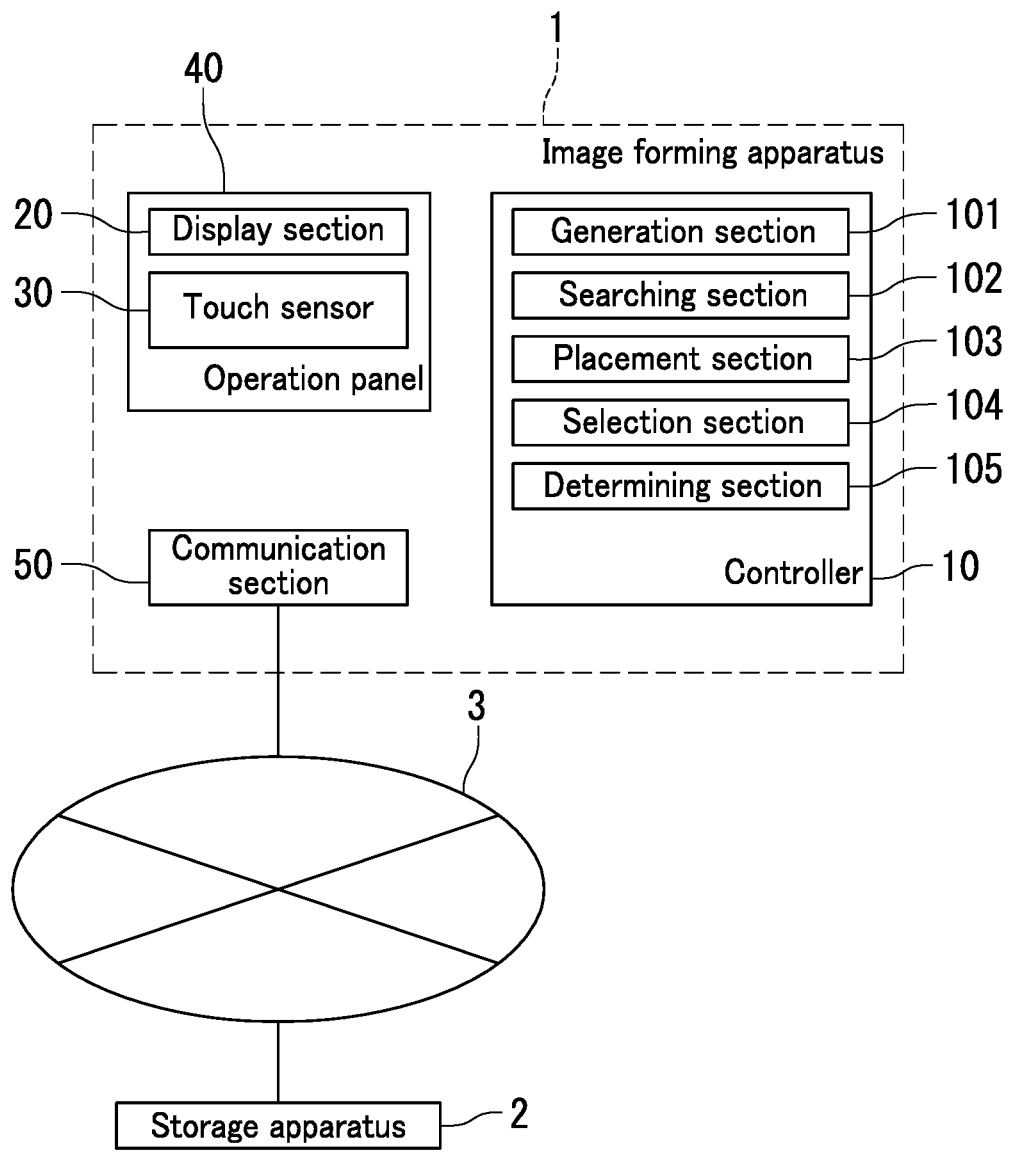
FIG. 2 is a diagram illustrating a searching system including the image forming apparatus from FIG. 1.

Next, a searching system including the image forming apparatus 1 will be described with reference to FIG. 2. FIG. 2 illustrates the searching system. The searching system includes the image forming apparatus 1, a storage apparatus 2, and a network 3. The storage apparatus 2 is a server, for example, and stores a plurality of images. The network 3 connects the image forming apparatus 1 to the storage apparatus 2. The network 3 is a local area network (LAN) for example.

Next, the controller 10 will be described with reference to FIG. 2. The controller 10 includes a processor and storage, for example. The processor includes a central processing unit (CPU), for example. The storage includes memory, for example, and may further include a hard disk drive (HDD). The storage stores data and computer programs.

As illustrated in FIG. 2, the controller 10 includes a generation section 101, a searching section 102, a placement section 103, a selection section 104, and a determining section 105. The controller 10 functions as the generation section 101, the searching section 102, the placement section 103, the selection section 104, and the determining section 105 by executing a computer program.

The generation section 101 includes an optical character recognition (OCR) function, for example, and generates a first search condition based on a first image. The first image is contained in a predetermined shape. The predetermined shape (a square or an oval, for example) is enclosed by lines. The predetermined shape is also included in a document image read from the original document by the image reading section 110. The document image exhibits the original document. The determining section 105 determines Whether or not the predetermined shape contains the first image.

The searching section 102 searches for a second image that fulfills the first search condition from the storage apparatus 2.

The placement section 103 places the second image in a first area. The first area is within the document image. The predetermined shape is located in the first area. The placement section 103 also includes an editing function. The editing function modifies the second image so that the size and orientation of the second image are suitable for the first area. The editing function includes a second image enlargement function, a second image reduction function, and a second image rotation function. The selection section 104 selects a second image from a plurality of second images.

Figure 3:
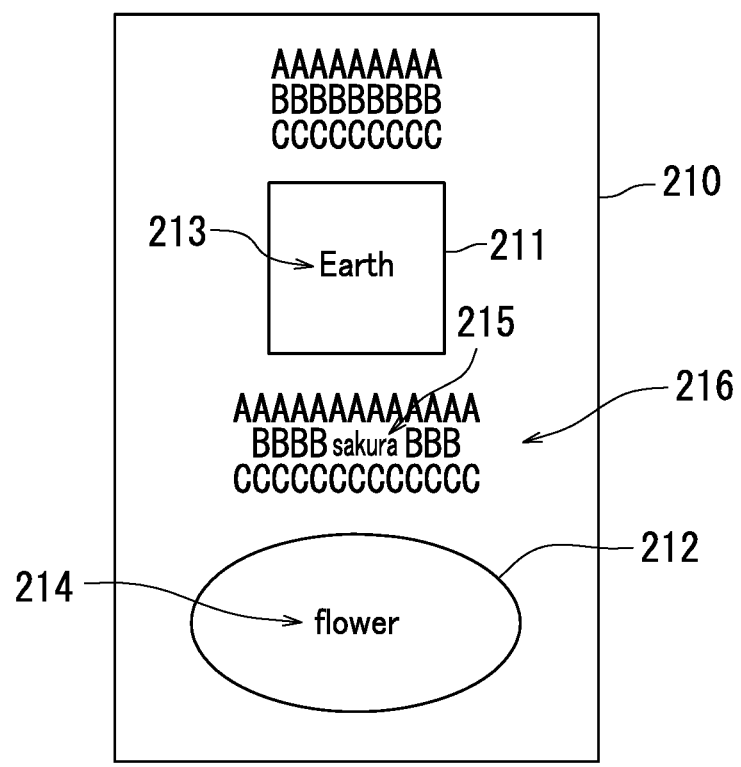
FIG. 3 is a diagram illustrating an original document.

Next, an original document 210 will be described with reference to FIG. 3. FIG. 3 illustrates the original document 210. The original document 210 may be created using a word processor, for example, or may be handwritten.

As illustrated in FIG. 3, the original document 210 includes a predetermined shape 211, a predetermined shape 212, and a text image 216. The text image 216 exhibits text and is located in a second area. The second area differs from the first area of the document image. The text image 216 includes a plurality of third images 215. The third images 215 exhibit symbols or symbol strings. In the example illustrated in FIG. 3, the text image 216 includes a third image 215 exhibiting the word "sakura". Note that in the present embodiment, "symbols" include letters, numbers, and narrowly defined symbols ("?", "!", and "%", for example).

The predetermined shape 211 is a square diagram, and contains a first image 213. The first image 213 exhibits the word "Earth". The predetermined shape 212 is an oval diagram, and contains a first image 214. The first image 214 exhibits the word "flower". Note that a predetermined shape is not limited to a square or oval diagram, and may be any shape (a triangle or a star, for example) as long as the predetermined shape is a diagram enclosed by lines.

[Basic Principle]

Next, the operation of the controller 10 will be described with reference to FIG. 3. The controller 10 performs a searching process and a placement process. Basically, the searching process searches for second images based on first images located in the predetermined shapes 211 and 212. Basically, the placement process places the second images in the first areas.

To begin, a basic first searching process and a first placement process that comes after the first searching process will be described.

As illustrated in FIG. 3, the image reading section 110 reads a document image including the predetermined shapes 211 and 212 from the original document 210 in the first searching process. The determining section 105 determines whether or not first images 213 and 214 are contained in the predetermined shapes 211 and 212.

The generation section 101 extracts the first image 213 contained in the predetermined shape 211 and the first image 214 contained in the predetermined shape 212. The generation section 101 generates the keyword "Earth" as a first search condition based on the first image 213 and generates the keyword "flower" as another first search condition based on the first image 214. The generation section 101 then enters the keywords "Earth" and "flower" into the searching section 102.

The searching section 102 searches for a second image exhibiting an "Earth", which is an object, from the storage apparatus 2 based on the keyword "Earth". The searching section 102 also searches for a second image exhibiting a "flower", which is an object, from the storage apparatus 2 based on the keyword "flower".

Next, the first placement process will be described. In the first placement process, the placement section 103 places the second image exhibiting "Earth" in a first area in which the predetermined shape 211 is located. The placement section 103 also places the second image exhibiting "flower" in a first area in which the predetermined shape 212 is located.

According to the image forming apparatus 1 of the present embodiment as described above with reference to FIGS. 1 to 3, a first search condition (the keyword "Earth", for example) is generated based on the first image 213 contained in the predetermined shape 211. A second image fulfilling the first search condition is found in the storage apparatus 2 and placed in the first area in which the predetermined shape 211 is located. Another first search condition (the keyword "flower", for example) is also generated based on the first image 214 contained in the predetermined shape 212. A second image fulfilling the other first search condition is found in the storage apparatus 2 and placed in the first area in which the predetermined shape 212 is located. Accordingly, the user can create a document with the desired images placed in the position of a predetermined shape by only placing a predetermined shape such as an oval or a square in the original document 210 and placing a first image (the word "Earth" or the word "flower", for example) in the predetermined shape. As a result, a document containing an image can be easily created without resorting to manual labor according to the present embodiment.

Figure 4:
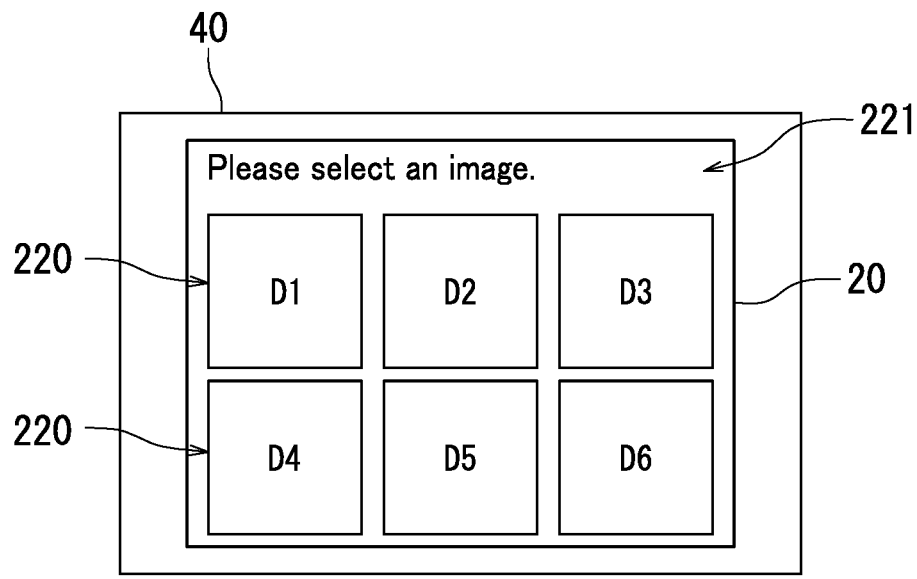
FIG. 4 is a diagram illustrating a display section.
Figure 5:
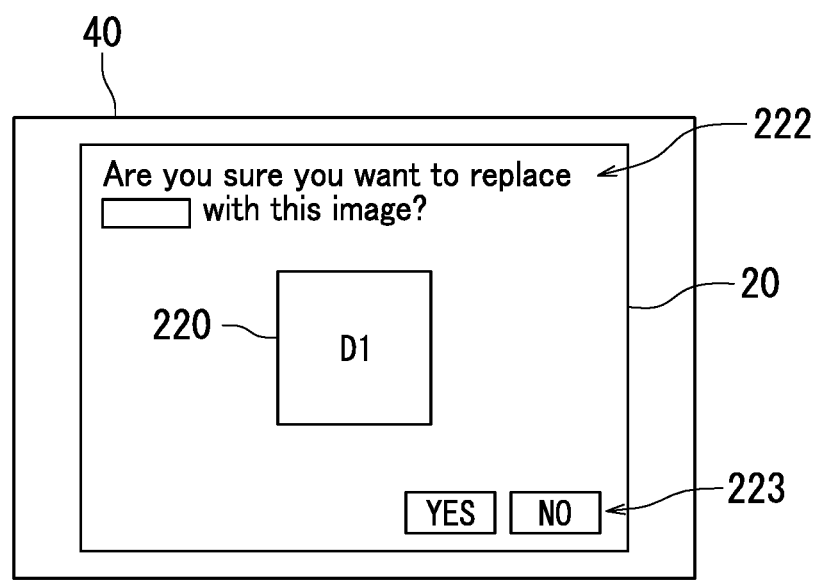
FIG. 5 is a diagram illustrating the display section.

Note that in the first embodiment, a first selection process can be executed in addition to the first searching process and the first placement process. The first selection process will be described as follows with reference to FIGS. 4 and 5. FIGS. 4 and 5 each illustrate the display section 20. The first selection process selects a second image 220 to be placed in the first area from a plurality of second images 220 in the first placement process when a plurality of second images 220 are found in the first searching process.

As illustrated in FIG. 4, the display section 20 displays the second images 220 (images "D1", "D2", "D3", "D4", "D5", and "D6") and a message 221 in the first selection process. The second images 220 each fulfill the keyword "Earth" as a first search condition. That is, the second images 220 respectively exhibit "Earth" objects. The message 221 includes text to prompt the selection of a second image 220 from the second images 220.

In the display section 20 illustrated in FIG. 4, the user performs a touch operation on a second image 220 (the image "D1", for example) to tentatively select the image "D1". A screen displayed by the display section 20 then shifts to a screen illustrated in FIG. 5.

As illustrated in FIG. 5, the display section 20 displays a second image 220 (the image "D1"), a message 222, and confirmation buttons 223. The message 222 includes text to prompt the user to confirm whether or not to make a final selection of the second image 220. The confirmation buttons 223 include a "YES" button for the user to make a final selection of the second image 220 and a "NO" button to cancel the tentative selection. The selection section 104 selects the second image 220 (the image "D1") from the second images 220 when the user performs a touch operation on the "YES" button of the confirmation buttons 223. By contrast, the screen displayed by the display section 20 shifts to the screen illustrated in FIG. 4 when the user performs a touch operation on the "NO" button.

According to the image forming apparatus 1 of the present embodiment as described above with reference to FIGS. 4 and 5, the selection section 104 selects a second image 220 from the second images 220 according to an instruction from the user. Therefore, the placement section 103 can place a second image 220 more appropriate to the intention of the user in the first area when a plurality of second images 220 is found.

Note that the generation section 101 generates a plurality of first search conditions each corresponding to a first image when a plurality of first images is contained in a predetermined shape. For example, the generation section 101 generates a first search condition from the first image exhibiting a symbol string "AB" when the predetermined shape contains a symbol string divided into two groups (a symbol string "AB C" for example). The generation section 101 also generates another first search condition from the first image exhibiting the symbol "C". The searching section 102 searches for a second image 220 fulfilling all of the first search conditions corresponding to the first images from the storage apparatus 2.

According to the image forming apparatus 1 of the present embodiment as described above, when a predetermined shape contains a plurality of first images, a second image 220 fulfilling all of first search conditions corresponding to the first images is searched for. That is, the searching section 102 searches for a second image 220 using all of the first search conditions as AND conditions. Accordingly, the searching section 102 can find a more appropriate second image 220 as a second image 220 to be placed in the first area.

Second Embodiment

Next, a second embodiment of the present disclosure will be described with reference to FIGS. 1 to 8.

In the first embodiment, the controller 10 executes the first searching process and the first placement process. In the second embodiment, the controller 10 executes the first searching process, a second searching process, and a second placement process. As follows, the main points of difference between the second embodiment and the first embodiment will be described.

In the second embodiment, the controller 10 searches for a second image 220 that fulfills the first search condition by executing the first searching process. The controller 10 executes the second searching process subsequently to the first searching process. In the second searching process, the searching section 102 searches for a fourth image that fulfills a second search condition. The second search condition is associated with the first search condition. The generation section 101 generates the second search condition based on the third image 215 located in the second area. The second placement process is executed subsequently to the second searching process. In the second placement process, the placement section 103 places a second image 220 or a fourth image in the first area. The placement section 103 includes an editing function. The editing function includes enlargement, reduction, and rotation functions so as to make the size and orientation of the second image 220 or the fourth image suitable for the first area.

The second searching process and the second placement process will be described in detail as follows with reference to FIG. 3. As illustrated in FIG. 3, the image reading section 110 reads the document image including the text image 216 from the original document 210 in the second searching process. The generation section 101 extracts the third image 215 indicating the second search condition from the text image 216. Specifically, a table in which the second search condition is associated with the first search condition is stored in the storage of the controller 10. For example, a table in which the second search condition (for example, the keywords "rose", "sakura", etc. is associated with the keyword "flower" as the first search condition is stored in the storage.

The generation section 101 acquires the second search condition from table based on the keyword "flower" as the first search condition, and extracts an image indicating the second search condition from the text image 216. In the example illustrated in FIG. 3, the text image 216 includes the third image 215 exhibiting the word "sakura", and the generation section 101 extracts the third image 215 exhibiting the word "sakura" from the text image 216.

The generation section 101 generates the keyword "sakura" as the second search condition from the third image 215 exhibiting the word "sakura" and enters the keyword into the searching section 102. The searching section 102 searches for a fourth image fulfilling the keyword "sakura" from the storage apparatus 2. The fourth image exhibits a "sakura" object or a "sakura flower" object, for example.

Next, the second placement process will be described. In the second placement process, the placement section 103 places the second image 220 as a search result of the first searching process or the fourth image as a search result of the second searching process in the first area in which the predetermined shape 212 is located. Specifically, the placement section 103 places the second image 220 exhibiting a "flower" object or the fourth image exhibiting a "sakura" or "sakura flower" object in the first area.

According to the image forming apparatus 1 of the present embodiment as described above with reference to FIG. 3, the searching section 102 searches for both a second image 220 fulfilling the first search condition and a fourth image fulfilling the second search condition when there is a third image 215 indicating the second search condition in the second area. Accordingly, the second search condition is generated from a word related to the first search condition, and the fourth image fulfilling the second search condition is searched for when there is a word related to the first search condition in the original document 210, for example. The second image 220 or the fourth image is then placed in the first area. As a result, the range of selection widens, and an image that is more appropriate to the contents of the original document 210 can be placed in the first area.

Note that in the second embodiment, a second selection process can be executed in addition to the first searching process, the second searching process, and the second placement process. The second selection process will be described as follows. The second selection process selects an image from a plurality of images when there is a plurality of images (second images 220 or fourth images) that can be placed in the first area in the second placement process. Specifically, the selection section 104 selects an image from either or both the second images 220 and the fourth images in the second selection process. Alternatively, the selection section 104 selects an image from at least one second image 220 and at least one fourth image in the second selection process.

Figure 6:
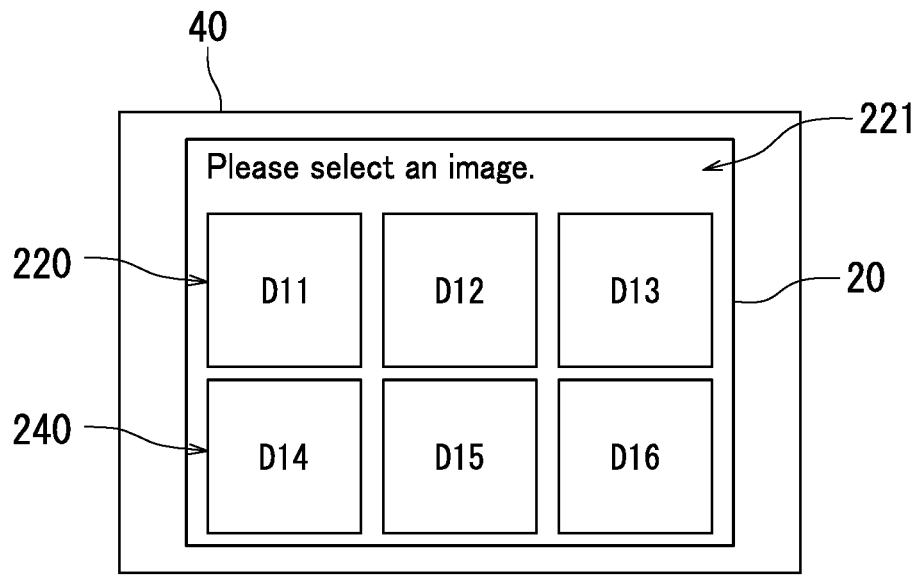
FIG. 6 is a diagram illustrating the display section.
Figure 7:
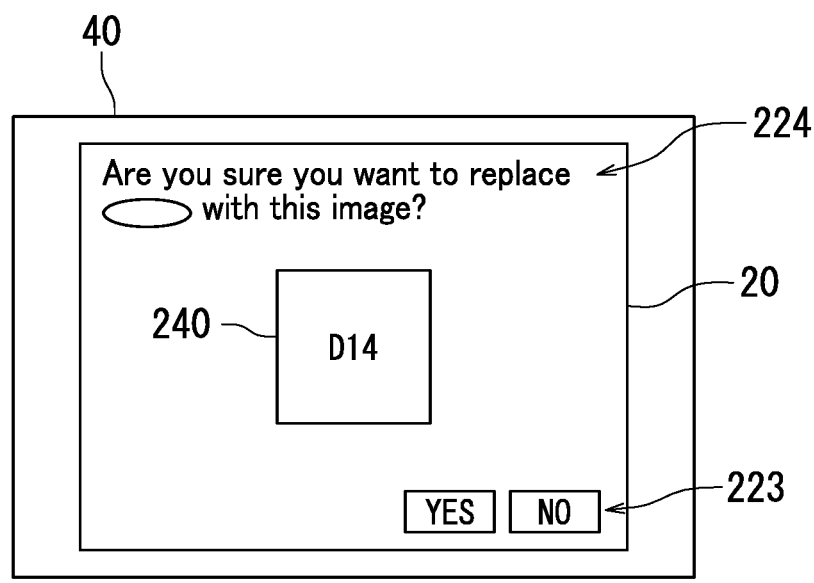
FIG. 7 is a diagram illustrating the display section.

The second selection process will be described in detail as follows with reference to FIGS. 6 to 8. FIGS. 6 and 7 each illustrate the display section 20. The display section 20 illustrated in FIG. 6 displays three second images 220 (images "D1", "D12", and "D13"), three fourth images 240 (images "D14", "D15", and "D16"), and a message 221. The three second images 220 each fulfill the keyword "flower" as the first search condition. That is, the three second images 220 respectively exhibit "flower" objects. The three fourth images 240 each fulfill the keyword "sakura" as the second search condition. That is, the three fourth images 240 respectively exhibit "sakura" or "sakura flower" objects.

In the display section 20 illustrated in FIG. 6, the user performs a touch operation on a fourth image 240 (the image "D14") to tentatively select the image "D14", for example. A screen displayed by the display section 20 then shifts to a screen illustrated in FIG. 7.

As illustrated in FIG. 7, the display section 20 displays a fourth image 240 (the image "D14"), a message 224, and confirmation buttons 223. The message 224 includes text to prompt the user to confirm whether or not to make a final selection of the fourth image 240. The selection section 104 selects a fourth image 240 (the image "D14") from the second images 220 and the fourth images 240 when the user performs a touch operation on the "YES" button of the confirmation buttons 223. By contrast, when the user performs a touch operation on the "NO" button, the screen displayed by the display section 20 shifts to the screen illustrated in FIG. 6.

Figure 8:
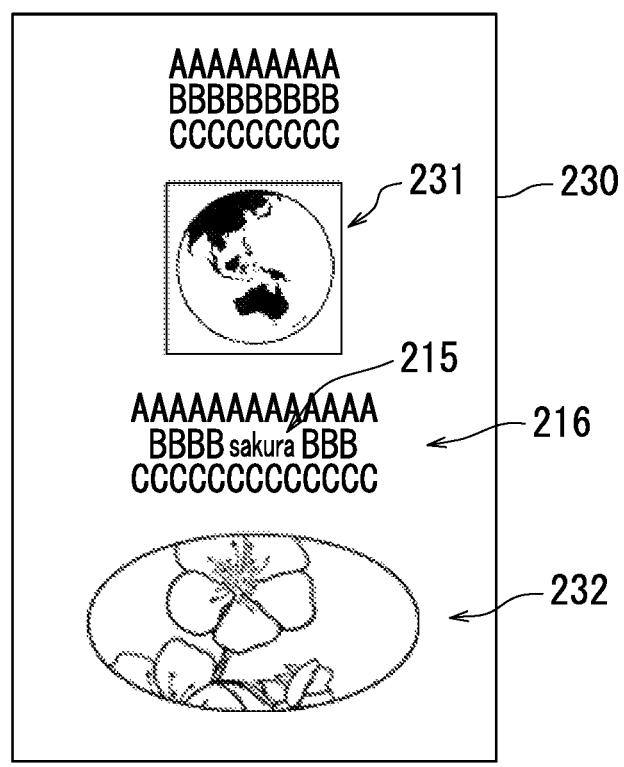
FIG. 8 is a diagram illustrating a sheet on which images are formed.

FIG. 8 illustrates a result 230. The result 230 is the sheet T on which images are formed by the image forming section 140. The result 230 includes an image 231 (the image "D1") exhibiting an "Earth" object, an image 232 (the image "D14") exhibiting a "sakura flower" object, and the text image 216.

According to the image forming apparatus 1 of the present embodiment as described above with reference to FIGS. 6 to 8, the selection section 104 selects an image (the image "D14") from the second images 220 and the fourth images 240 according to an instruction of the user. Therefore, the placement section 103 can place an image that is more appropriate to the intention of the user in the first area.

Figure 9:
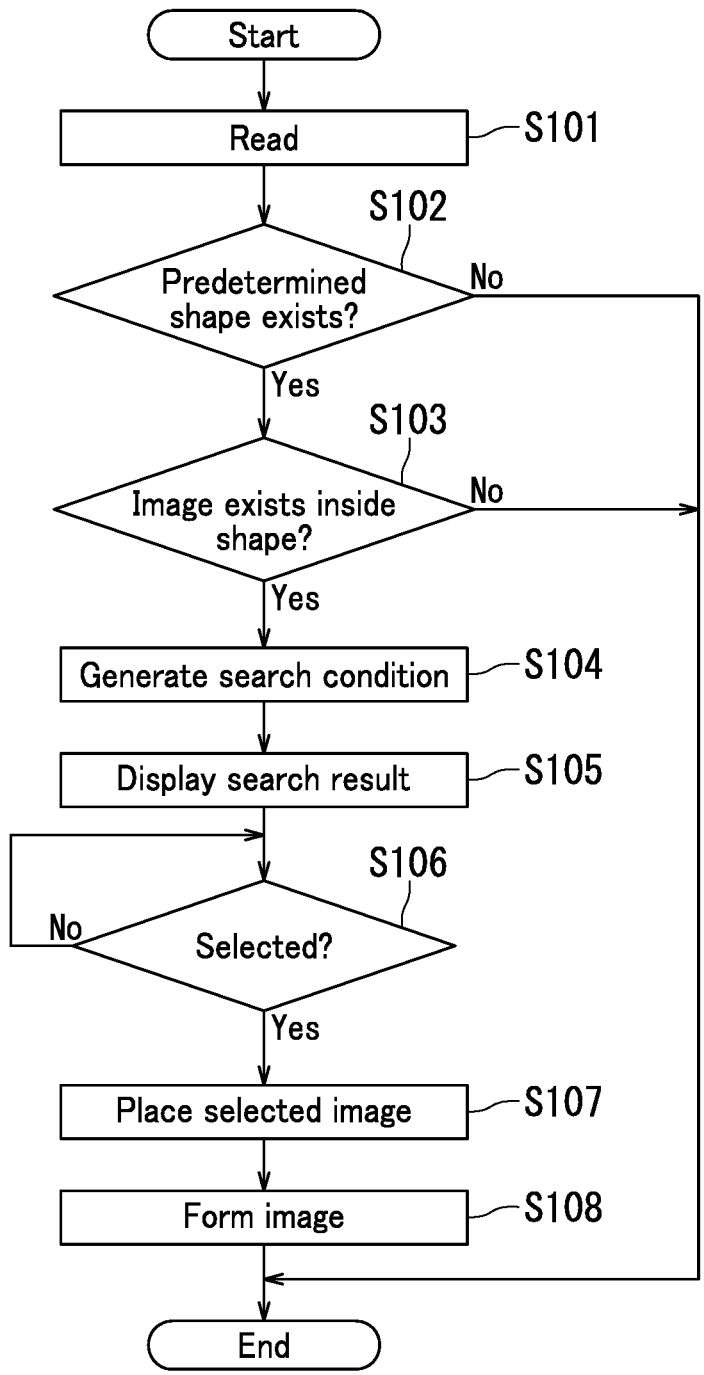
FIG. 9 is a flowchart illustrating operation of a controller from FIG. 1.

Next, operation of the controller 10 in the second embodiment will be described in further detail with reference to FIG. 9. FIG. 9 is a flowchart illustrating the operation of the controller 10.

In Step S101, the controller 10 directs the image reading section 110 to read a document image including a predetermined shape (the predetermined shapes 211 and 212) from the original document 210.

In Step S102, the determining section 105 determines whether or not the document image includes a predetermined shape. The process ends when it is determined that the document image includes no predetermined shape (No in Step S102). When it is determined that the document image includes a predetermined shape (Yes in Step S102) by contrast, the process advances to Step S103.

In Step S103, the determining section 105 determines whether or not the predetermined shape contains a first image (the first image 213 or 214). The process ends when it is determined that the predetermined shape contains no first image (No in Step S103). When it is determined that the predetermined shape contains a first image (Yes in Step S103) by contrast, the process advances to Step S104.

In Step S104, the generation section 101 generates a first search condition (the keywords "Earth" and "flower") based on the first image. The generation section 101 also extracts the third image 215 from the text image 216 and generates a second search condition (the keyword "sakura").

In Step S105, the searching section 102 searches for a second image 220 fulfilling the first search condition from the storage apparatus 2. The searching section 102 also searches for a fourth image 240 fulfilling the second search condition from the storage apparatus 2. The controller 10 directs the display section 20 to display either or both of at least one second image 220 and at least one fourth image 240 when there are either or both second images 220 and fourth images 240.

In Step S106, the controller 10 determines whether or not the selection section 104 has selected an image from either or both of at least one second image 220 and at least one fourth image 240 displayed by the display section 20. The controller 10 waits until the selection section 104 selects an image when it is determined that an image has not been selected (No in Step S106). When it is determined that an image has been selected (Yes in Step S106) by contrast, the process advances to Step S107.

In Step S107, the placement section 103 places the selected image in the first area.

In Step S108, the controller 10 directs the image forming section 140 to form the document image including the selected image on the sheet T in Step S108 and the process ends.

Embodiments of the present disclosure are described above with reference to the drawings (FIGS. 1 to 9). However, the present disclosure is not limited to the above embodiment, and may be implemented in various manners within a scope not departing from the gist thereof (as described below in (1) to (5), for example). The drawings schematically illustrate elements of configuration in order to facilitate understanding, and properties of elements of configuration illustrated in the drawings, such as thicknesses, lengths, and numbers thereof, may differ from actual properties thereof in order to facilitate preparation of the drawings. Furthermore, properties of elements of configuration described in the above embodiment, such as shapes and dimensions, are merely examples and are not intended as specific limitations. The properties may be altered within a scope not substantially deviating from the effects of the present disclosure.

(1) In an embodiment of the present disclosure as described with reference to FIG. 3, the controller 10 executes the first searching process and the second searching process as searching processes. However, the present disclosure is not limited hereto. The controller 10 may further execute a third searching process. The third searching process uses a third search condition to narrow the number of either or both of the second images 220 and the fourth images 240 found by the search to a suitable number of images.

The image forming apparatus 1 receives input of the third search condition in the third searching process. The third search condition is information indicating the resolution, the size, the number of colors, the date (the date a photo was taken or an image was generated, for example), the location (the name of the country, state or province, city or town where the photo was taken, for example), or the creator of the second image 220, for example. The user enters the third search condition into the searching section 102 through the operation panel 40, for example.

The searching section 102 searches for a second image 220 fulfilling the first search condition and the third search condition from the storage apparatus 2 when the image forming apparatus 1 receives the input of the third search condition. The searching section 102 also searches for a fourth image 240 fulfilling the second search condition and the third search condition from the storage apparatus 2 when there is a third image 215 indicating the second search condition in the second area.

According to the image forming apparatus 1 of the present variation as described above, a second image 220 fulfilling the first search condition and the third search condition or a fourth image 240 fulfilling the second search condition and the third search condition are searched for when the image forming apparatus 1 receives the input of the third search condition. Accordingly, the number of images found can be prevented from becoming excessively large. In other words, the search target can be narrowed, and the searching section 102 can search for a second image 220 that is more appropriate to the intention of the user.

(2) In the embodiments of the present disclosure as described with reference to FIG. 3, the generation section 101 generates a first search condition based on first images 213 and 214 exhibiting symbols or symbol strings. However, the present disclosure is not limited hereto. The first images 213 and 214 may also exhibit shapes (including hand-drawn shapes or pictures). The searching section 102 searches for second images 220 by searching for similar images when the first images 213 and 214 exhibit shapes. Specifically, the generation section 101 extracts features as first search conditions from the first images 213 and 214. The searching section 102 searches for a second image 220 fulfilling the first search conditions from the storage apparatus 2.

(3) In the embodiments of the present disclosure as described with reference to FIG. 3, the searching section 102 searches for both a second image 220 and a fourth image 240 when there is a third image 215 indicating a second search condition. In other words, the searching section 102 searches for images with the first search condition and the second search condition as OR conditions. However, the present disclosure is not limited hereto. The searching section 102 may also search for images fulfilling both the first search condition and the second search condition. In other words, the searching section 102 may also search for images fulfilling both the first search condition and the second search condition as AND conditions.

(4) In the embodiments of the present disclosure, the searching section 102 searches for a second image 220 that fulfills all of the first search conditions corresponding to the first images when a predetermined shape includes a plurality of first images (a first image exhibiting the symbol string "AB" and a first image exhibiting the symbol "(", for example). In other words, the searching section 102 searches for a second image 220 with the first search conditions corresponding to the first images as AND conditions. However, the present disclosure is not limited hereto. The searching section 102 may also search for a second image 220 fulfilling any of the first search conditions corresponding to the first images when a predetermined shape includes a plurality of first images. In other words, the searching section 102 may search for a second image 220 with the first search conditions corresponding to the first images as OR conditions.

(5) In the embodiments of the present disclosure as described with reference to FIG. 2, the storage apparatus 2 is connected to the image forming apparatus 1 through the network 3. However, the present disclosure is not limited hereto. The storage apparatus 2 may be integrated into the image forming apparatus 1. For example, images may be stored on a storage hard disk drive (HDD) of the controller 10, and the searching section 102 may search for second images 220 and fourth images 240 from the HDD.

What is claimed is:

1. An image forming apparatus for forming an image on a sheet, comprising:
 a reading section configured to read a predetermined shape from an original document, the predetermined shape being a diagram enclosed by lines;
 a determining section configured to determine whether or not the predetermined shape contains therein a word indicating an object, the predetermined shape not containing therein an object image indicating the object;
 storage configured to store therein a table in which another word stored in the table associated with the word indicating the object;
 a generation section;
 a searching section;
 a display section configured to display an image;
 a selection section configured to select one image; and
 a placement section, wherein
 the image forming apparatus is connected to a storage apparatus through a network,
 the storage apparatus stores a plurality of object images therein,
 the generation section:
 generates a first keyword from the word indicating the object contained in the predetermined shape when the determining section determines that the predetermined shape contains therein the word indicating the object;
 acquires, based on the first keyword, from the table stored in the storage, the word associated with the word indicating the object contained in the predetermined shape as a second keyword; and
 extracts a word indicating the second keyword from a sentence located in a second area which differs from a first area in which the predetermined shape is placed among a document image exhibiting the original document,
 the searching section searches for two or more object images fulfilling a search condition entered by a user and corresponding to the word indicating the second keyword extracted by the generation section from the plurality of object images stored in the storage apparatus connected through the network,
 the display section displays the two or more object images acquired by a search of the searching section,
 the selection section selects one object image among the two or more object images, and
 the placement section edits a size and orientation of the selected one object image and places the selected one object image in the predetermined shape of the first area.

2. The image forming apparatus according to claim 1, further comprising an image forming section configured to form the image on the sheet, wherein
 the placement section places the selected one object image in the predetermined shape of the first area, and
 the image forming section forms the document image including the selected one object image on the sheet.

3. The image forming apparatus according to claim 1, wherein
 the searching section searches for the two or more object images fulfilling the search condition entered by the user and corresponding to the first keyword from the plurality of images stored in the storage apparatus connected through the network, and the search condition includes information indicating a resolution of the image, information indicating a size of the image, information indicating a number of colors in the image, a location, a name of a country, a name of a state or province, a name of a city or town, or a creator of the image.

4. The image forming apparatus according to claim 1, wherein the search condition includes information indicating a resolution of the image, information indicating a size of the image, information indicating a number of colors in the image, a location, a name of a country, a name of a state or province, a name of a city or town, or a creator of the image.

5. The image forming apparatus according to claim 1, wherein the word in the table acquired as the second keyword exhibits an example of the object corresponding to the first keyword.

6. The image forming apparatus according to claim 5, wherein the word in the table acquired as the second keyword is a word differing from the first keyword.

* * * * *